United States Patent [19]
Loewenthal

[11] Patent Number: 5,751,078
[45] Date of Patent: May 12, 1998

[54] REACTIONLESS, MOMENTUM COMPENSATED PAYLOAD POSITIONER

[75] Inventor: Stuart H. Loewenthal, San Jose, Calif.

[73] Assignee: Lockheed Martin Corp. Missiles & Space, Sunnyvale, Calif.

[21] Appl. No.: 724,777

[22] Filed: Oct. 3, 1996

[51] Int. Cl.$^6$ .......................... H02K 33/00; H02K 35/00
[52] U.S. Cl. ........................ 310/36; 310/37; 310/80; 244/165; 74/5.34; 74/5.47
[58] Field of Search .................... 310/36, 80, 37; 318/611, 119; 244/165; 74/5 T, 5.34, 5.47

[56] References Cited

U.S. PATENT DOCUMENTS

| | | | |
|---|---|---|---|
| 3,252,023 | 5/1966 | Schmidt . | |
| 3,514,778 | 5/1970 | Titus . | |
| 3,952,217 | 4/1976 | Rawlings . | |
| 4,021,716 | 5/1977 | Rue . | |
| 4,285,248 | 8/1981 | Noar et al. | 74/5 F |
| 4,587,860 | 5/1986 | Audren | 74/5 F |
| 4,608,874 | 9/1986 | Audren | 74/5.41 |
| 4,723,735 | 2/1988 | Eisenhaure et al. | 244/165 |
| 4,976,163 | 12/1990 | Schumacher | 74/5.47 |
| 4,997,414 | 3/1991 | Camara et al. . | |
| 5,012,170 | 4/1991 | Atlas . | |
| 5,013,986 | 5/1991 | Gauggel | 318/593 |
| 5,042,753 | 8/1991 | Atlas . | |
| 5,063,336 | 11/1991 | Atlas . | |
| 5,210,636 | 5/1993 | Baer . | |
| 5,214,749 | 5/1993 | Brown . | |
| 5,238,461 | 8/1993 | Gotman . | |
| 5,270,594 | 12/1993 | Hulsing, II . | |
| 5,277,076 | 1/1994 | Ostaszewski . | |
| 5,283,682 | 2/1994 | Ostaszewski . | |
| 5,396,815 | 3/1995 | Polites et al. | 74/61 |

OTHER PUBLICATIONS

"Angular–Momemtum–Compensating Actuator", NASA Technical Support Package, Oct. 1988, vol. 12, No. 9, Item #43, pp. i–26a.

*Primary Examiner*—Steven L. Stephan
*Assistant Examiner*—Elvin G. Enad
*Attorney, Agent, or Firm*—Feix & Feix

[57] ABSTRACT

A reactionless momentum compensated payload positioner adapted to be mounted on a supporting body for providing momentum compensation of an oscillatory and scanning payload and for suppressing reactions in the supporting body to the torques that occur as an aiming angle of the payload is changed. The payload positioner includes a gimbal assembly having at least two axis of rotation including an elevation axis and an azimuth axis. A pair of reactionless drive module are provided for rotating the payload about both axes. Each reactionless drive module includes a housing, a main drive shaft connected to the payload, a DC electric motor for rotating the drive shaft, and a flywheel. The main drive shaft is freely rotatably suspended within the housing by main bearings and the flywheel is freely rotatably mounted to the main drive shaft by bearings. [In operation, the flywheel counter rotates with respect to the main drive shaft.] The speed of the flywheel is effective to substantially eliminate reaction torques in the supporting body as the aiming angle of the payload is changed. The flywheel is also effective to provide momentum compensation to the payload and thereby substantially eliminate gyroscopic effects that occur due to rotational movement about either one of the two axis of the gimbal assembly. The invention further includes a first position transducer for determining and controlling payload pointing position and speed and a second position transducer for determining and controlling speed of said flywheel. A trim motor is provided for eliminating parasitic drag and for keeping the flywheel in registration with the payload and the payload in registration with the housing. [The trim motor is also effective to desaturate excessive speed build up of the flywheel due to bias speed errors.]

34 Claims, 5 Drawing Sheets

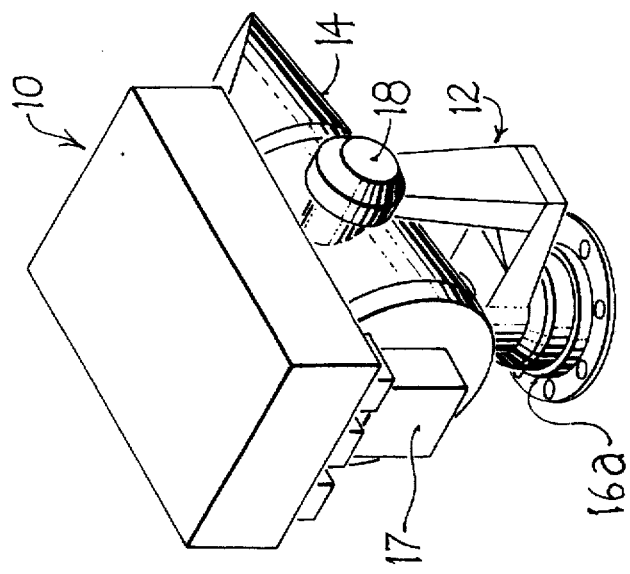
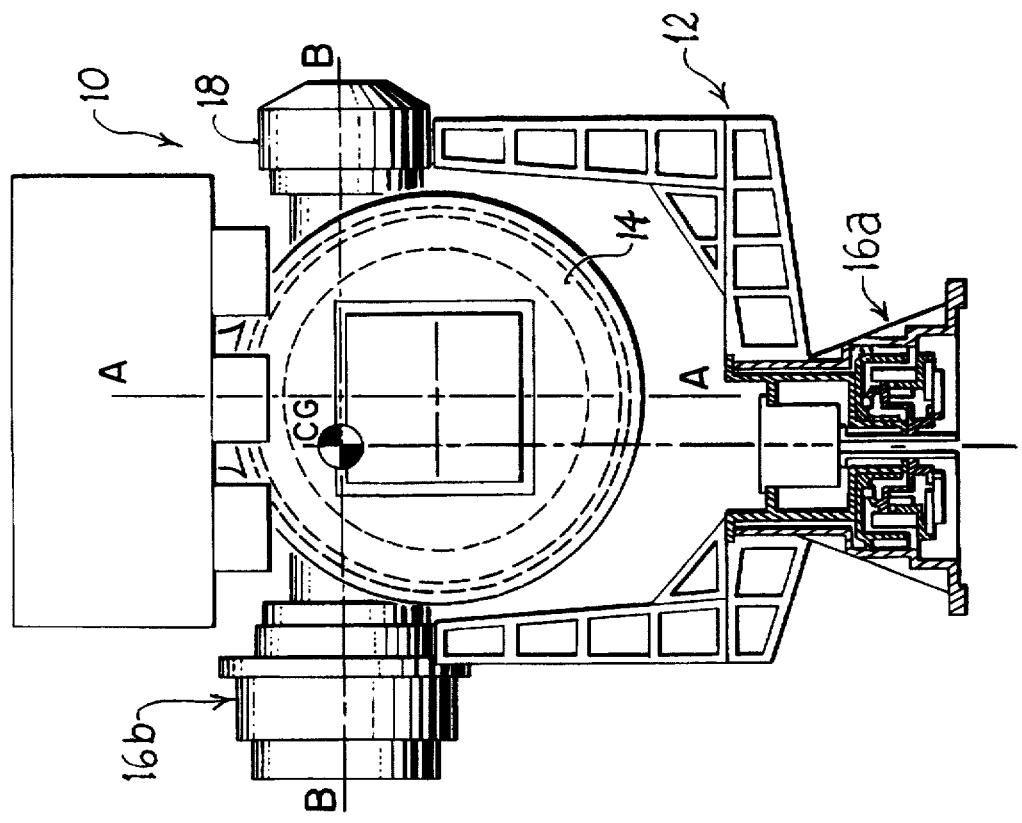

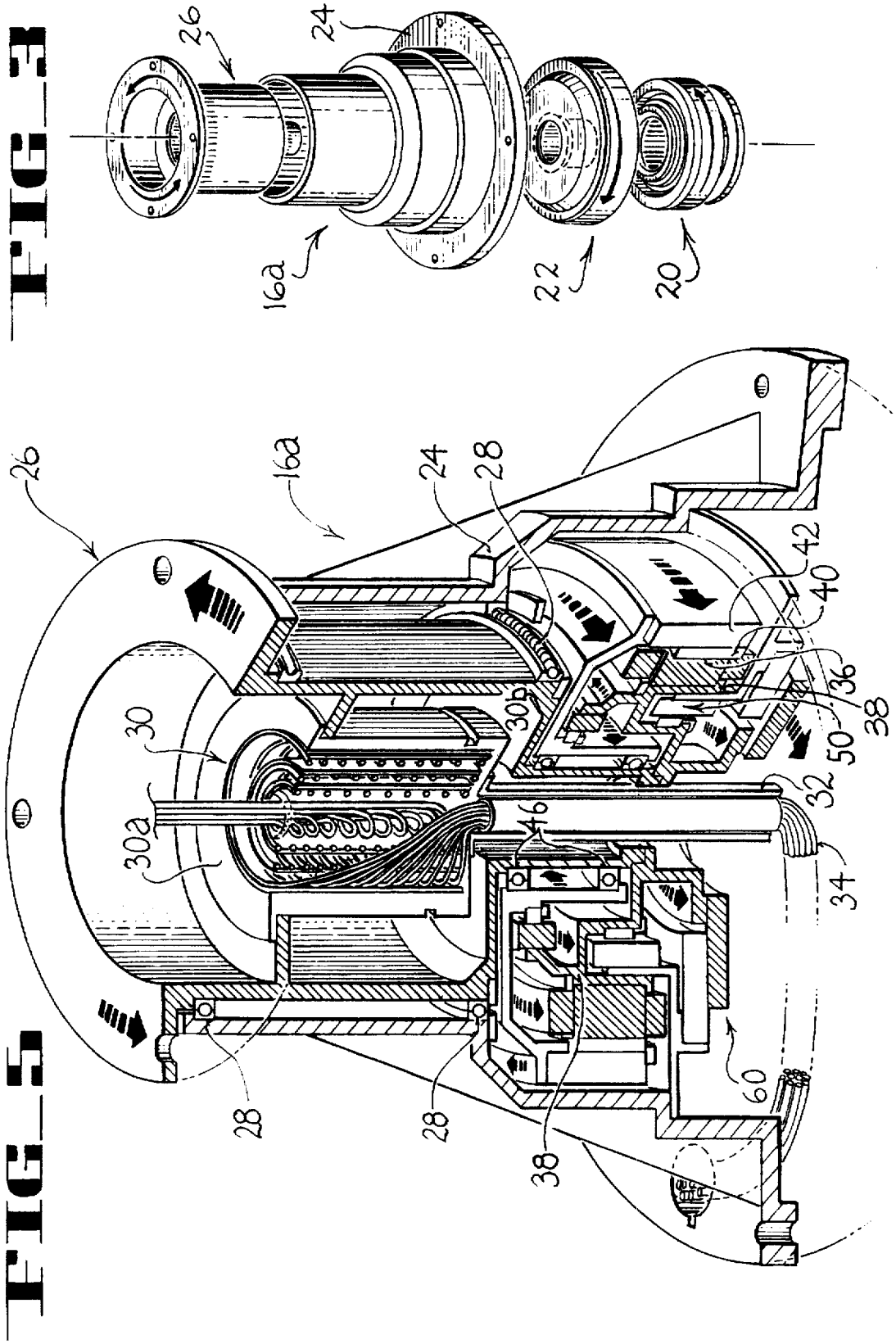

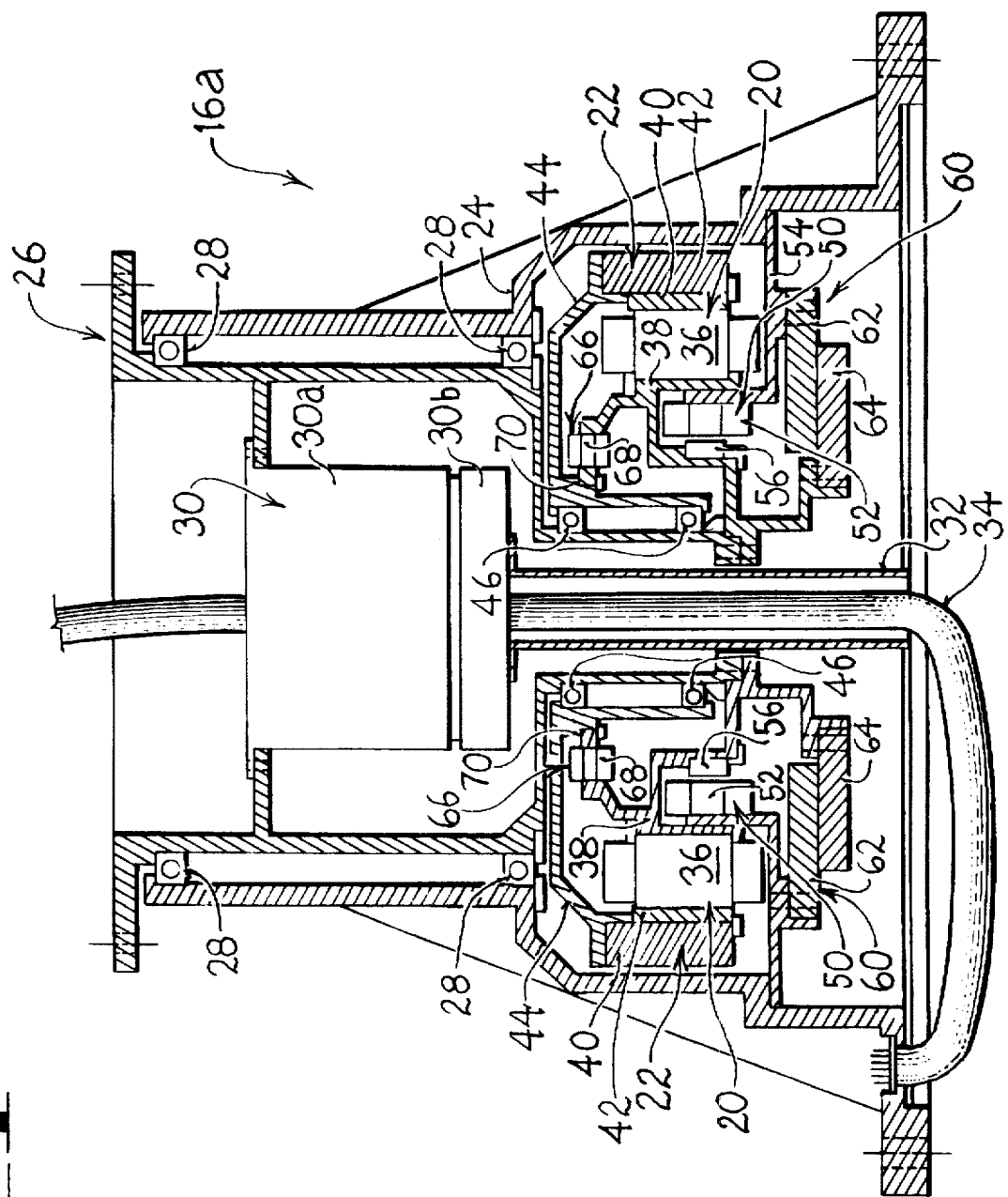
FIG_4

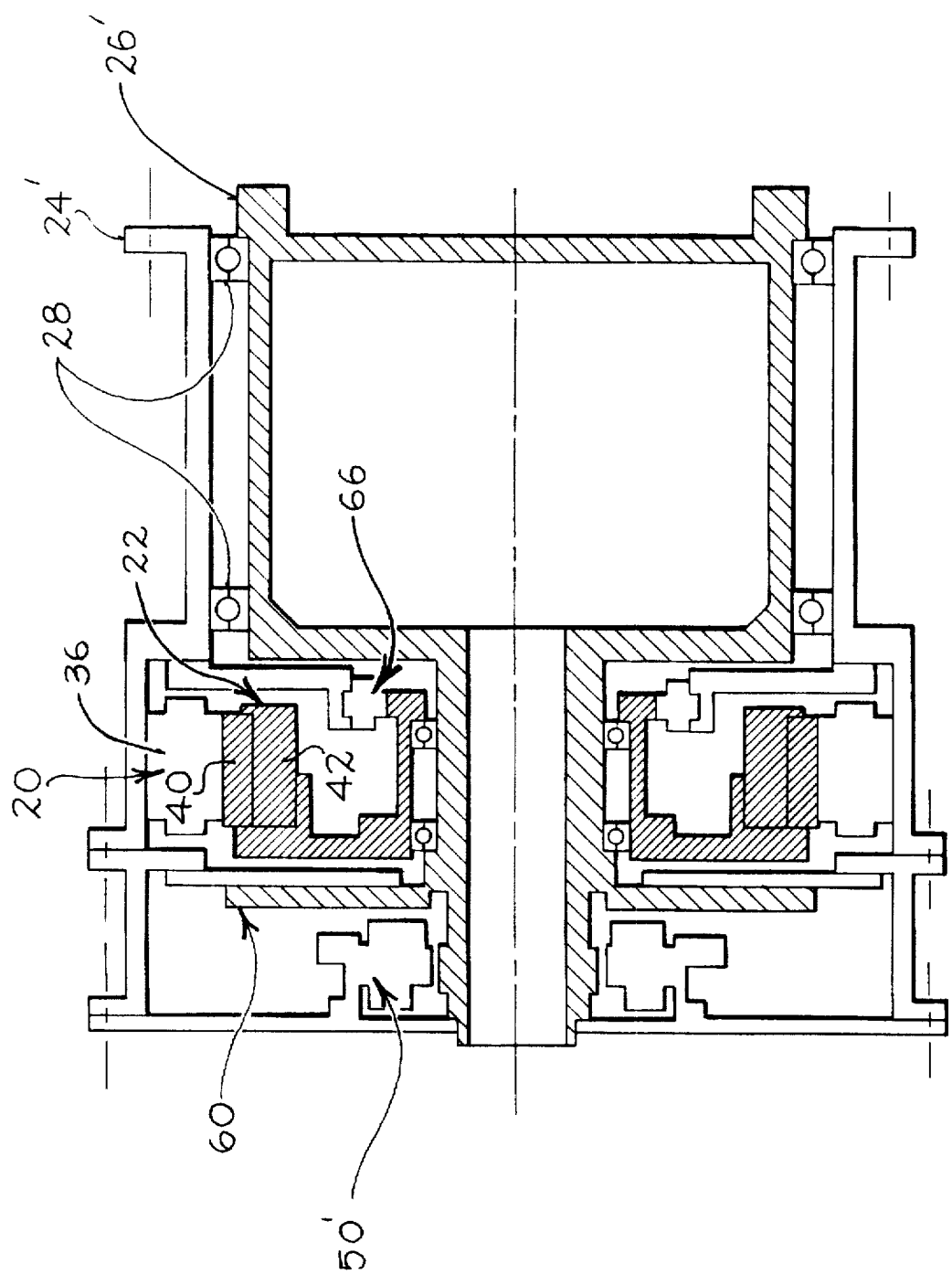
FIG_6

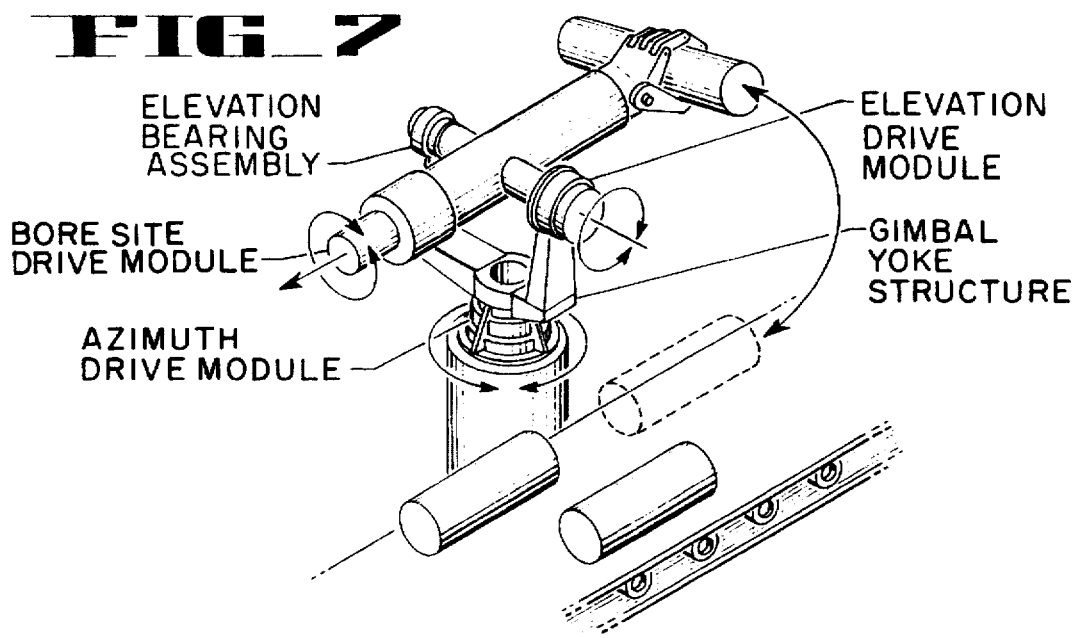
FIG_7
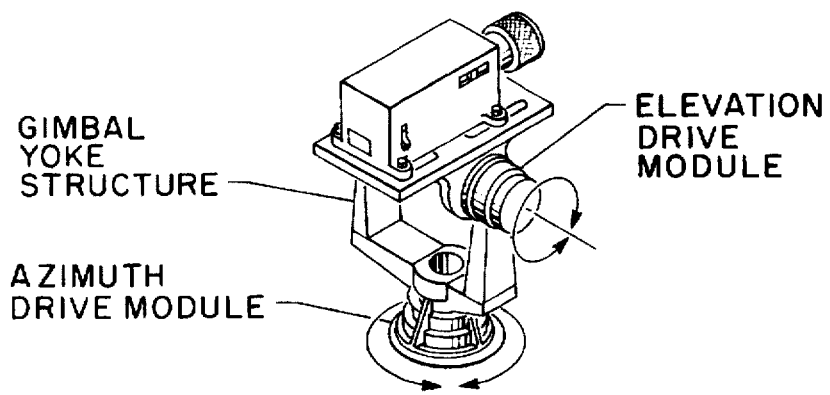
FIG_8
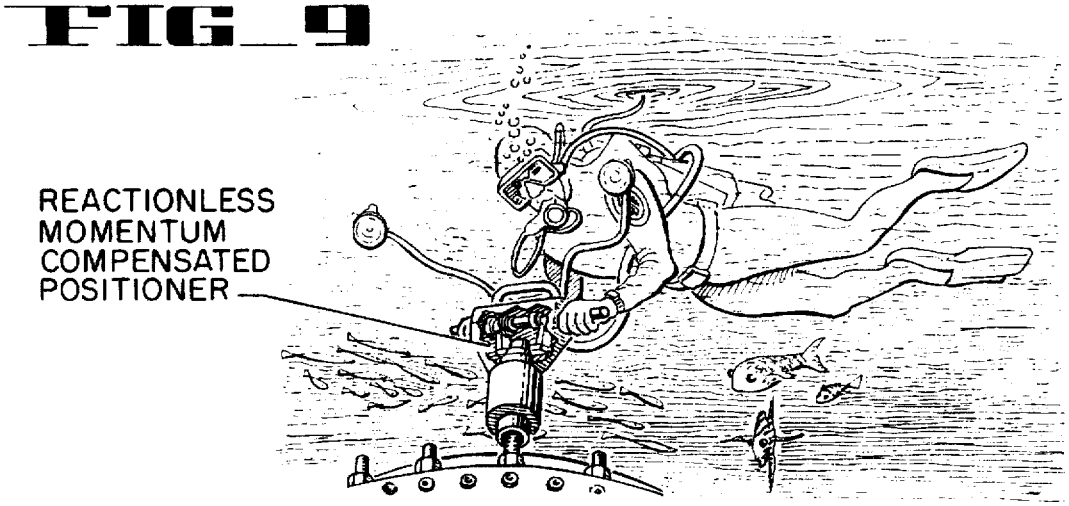
FIG_9

REACTIONLESS, MOMENTUM COMPENSATED PAYLOAD POSITIONER

BACKGROUND OF THE INVENTION

1. Field of the Invention

The present invention relates to an improved reactionless payload positioner adapted to be mounted on an instrument platform of an orbiting space satellite and which is effective to provide automatic momentum compensation of oscillatory and/or scanning payloads. The positioner also suppress reactions in its supporting body to the torques that occur as an aiming angle of the payload is changed. In addition to space applications, the present invention has significant utility for use in terrestrial applications wherein a positioning actuator is used to rapidly position large and/or heavy oscillatory payloads.

2. Description of the Related Art

Orbiting space satellites employ various types of torque producing devices for tracking and pointing missions. For example, gimbal systems are used for aiming payloads such as image sensors, antennas, scanning telescopes, mirrors, etc.

The sensors and other heavy payloads that are required to quickly scan or retarget can generate significant reaction torques back to the satellites's bus. These reaction torques can then excite structural modes, such as those from solar array appendages. The resulting motions are not only likely to create high stresses in the excited components, but can also cause jitter from vibration that can degrade sensor image quality. This is a particular concern for jitter-sensitive payloads mounted on the spacecraft structure which require a quiet platform.

Furthermore, momentum compensation must be provided for moving mechanisms on orbiting satellites in order to prevent precession due to gyroscopic torques. Station keeping functions such as these are normally performed by multi-axis control moment gyros or reactions wheels and thrusters. For most highly agile scanning payloads, reactions wheels have insufficient torque capability to hold the satellite stationary therefore requiring the use of large and expensive control moment gyros.

These large and expensive components also require costly and complex, servo-control compensation loops to correct for these momentum imbalances. In particular, control moment gyros and reaction wheels require inertial sensors to indicate incipient attitude errors from imbalances in momentum or dynamic torques. Counter accelerations are produced through the appropriate control laws which require sophisticated corrections such as bearing parasitic drag feed forwarding to minimize errors. Therefore, a pointing gimbal system which could provide automatic momentum compensation and torque correction without complex servo-electronics and attendant errors would be significant advance in the art.

Furthermore, the momentum of the control moment gyros and reaction wheels must match that of the oscillatory or scanning payload. This often requires the need for two large motors, one motor for driving the payload and a second motor for driving the reaction or momentum wheel. An example of an aiming actuator having a two motor arrangement is disclosed in NASA TECH BRIEF, Vol. 12, No. 9. Item #43 for "Angular-Momentum-Compensating Actuator" (1988).

The aiming actuator disclosed in the NASA TECH BRIEF is limited to positioning a payload about a single axis of rotation. There is no teaching or suggestion of using reactionless drive motors in a multi-axis pointing system. There are, of course, many technical considerations which must be addressed in the design of a quick and precise multi-axis pointing system that are not present in a single-axis aiming actuator. For example, a multi-axis pointing system requires additional motors for rotating the payload about the second (and third) axis and thus, a weight penalty and higher energy demands are introduced. For space applications in particular, the consumption of power is a very important design consideration in view of the limited power supply capability of space craft. Typically, solar arrays are used to generated electricity. The size of the arrays affect the cost and weight of the space craft and also the size of the booster that is required to put the space craft into orbit. Further, the added mass can unbalance the rotating system and therefore adversely affect the speed and agility of the pointing system A multi-axis pointing gimbal system having a dedicated drive module along each axis of rotation that are capable of performing both functions of the two motor arrangements of the single-axis aiming actuators of the prior art would be desirable, especially if it would reduce weight, reduce power consumption, reduce cost and provide enhanced reliability, particularly for large and/or quickly oscillating payloads.

Further, it would be desirable to use the multiple reactionless drive modules in a coordinated manner such that a significant portion of the energy normally consumed during braking or slowing of the payload along one axis of rotation can be recovered by electrically passing this energy to a second reactionless drive motor in the process of accelerating the payload along a second axis.

SUMMARY OF THE INVENTION

The present invention is directed to momentum compensated payload positioner adapted to be mounted on a supporting body of an orbiting space satellite for providing momentum compensation of an oscillatory and scanning payload and for suppressing reactions in the supporting body to the torques that occur as an aiming angle of the payload is changed. Pointing angles about one or more axes can be accommodated by the positioner of the present invention. In one embodiment, the positioner comprises a gimballed yoke structure for supporting and pointing the payload about two axes, namely an azimuth axis and an elevation axis. Reactionless drive modules are disposed along each of the elevation and azimuth axis of the gimbal structure. Each of the reactionless drive modules is operative to rotate the payload about its respective axis.

In a preferred embodiment, the reactionless drive modules include a brushless DC electric main drive motor and a counter-rotating momentum compensating flywheel assembly. The stator of the main drive motor is connected to the gimbaling payload while its rotor is connected to the momentum compensating flywheel assembly. The main drive motor is totally supported within a housing by bearings. Powering the motor causes the payload to accelerate in one direction and the flywheel to accelerate in the opposite direction. Since the torque acting on the stator and rotor of the main drive motor must be equal in magnitude and opposite in direction, the flywheel automatically torque balances the payload, having an acceleration that is inversely proportional to their respective rotating inertias. This is because the torque required to accelerate a body is directly proportional to the product of its inertia and angular acceleration.

Furthermore, the product of inertia and speed, or momentum, for both the payload and the flywheel must be always be equal and opposite since both elements are freely spinning on bearings and are thus substantially free of external torques following the principle of conservation of angular momentum. In this way, a relatively small, lightweight, flywheel will easily compensate for a much larger and heavier payload by simply spinning faster. Inertia ratios of 100 to 1 or more are practical. Therefore, payloads of 140 pounds in mass can be typically compensated by a flywheel having a mass on the order of only 7 or 8 pounds. Furthermore, none of the potentially large accelerating torques can be passed back to the spacecraft platform since the whole drive module is freely supported by bearings.

A small trim motor is provided for fine tuning the agile payload's speed profile. The trim motor also compensates for any stray parasitic reaction torques acting on the stable section, such as those resulting from bearing torque mismatch or from a power transfer device which is used to feed power to the rotating components. The trim motor produces just enough torque to overcome the drag torque to permit payload rotation at some speed. The reaction torque of the trim motor's stator, grounded to the spacecraft, exactly opposes the reaction torque from the bearings and flex wires also grounded to the spacecraft.

In addition, the trim motor provides the needed make up torque in combination with the main motor to keep the flywheel speed in registration with the payload speed, should some drift in speed occur. Some drift in flywheel speed over time is expected due to small internal losses in the rotating system. Pointing control and flywheel speed synchronization are easily provided by the payload pointing control servo.

With the present invention, both accelerating and constant speed torques are virtually eliminated, resulting in a degree of reactionless operation approaching 100%. In practice, 100% reactionless operation will not be realized, since some mispositioning errors associated with sensor pointing will result in some small acceleration/deceleration torques provided by the trim motor. Also, the trim motor will need to desaturate the flywheel from any build up in bias speed errors, which will be quite small. However, such stray torques will be small, accounting for less than 3% loss in complete torque/momentum balance.

The invention may be used in combination with small, conventional moment wheels or reaction wheels mounted on orthogonal axes. In this way, the major attitude disturbances with large payloads will be accommodated by the proposed invention, leaving the secondary trimming function to be performed by significantly down-sized, conventional wheels.

In an alternate embodiment, the relative positions of the drive motor assembly and flywheel assembly within the housing are reversed and the housing is adapted to rotate along with the payload while the main drive shaft is stationary.

The invention described herein, simply and automatically provides for both momentum compensation and torque isolation of oscillatory payloads about multiple axes without the need for complex servo-electronics.

The invention is able to cancel more than 97% of the payload's reaction torque and momentum. This advantageously enables the use of reaction wheels for station keeping functions rather than the much larger and more expensive control moment gyros. Also, residual vibrations induced by drive reaction torques from payload slewing are substantially reduced. This greatly improves the pointing accuracy of the payload and the accuracy of any adjacent payloads during operation.

A further advantage of the present invention is that momentum compensation and torques isolation is accomplished by a single, counter-rotating drive motor and flywheel in a drive package that is only slightly larger than that required on non-momentum compensated gimbals. In this way, a significant weight and power savings is realized. Applying such reactionless drive modules along other axes provides these advantages along with multiple axes of rotation.

Still another advantage of the present invention is that it does not require use of new or unproven drive components, but merely the rearrangement and repackaging of existing gimbal drive components having significant heritage and proven track performance.

Yet another advantage of the present invention is the use of more than one reactionless drive module in a coordinated manner such that a significant portion of the energy normally consumed during braking or slowing the payload along one axis of rotation can be recovered by electrically passing this energy to a second reactionless drive module in the process of accelerating the payload along a second axis.

Methods and apparatus which incorporate the features described above and which are effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

Embodiments of the invention are described by way of example with reference to the accompanying drawings, in which:

FIG. 1 is a side end elevation view in partial section which shows a reactionless momentum compensated payload positioner constructed in accordance with one embodiment of the present invention;

FIG. 2 is an isometric perspective view of the payload positioner of FIG. 1;

FIG. 3 shows an exploded perspective view of the principle components of the reactionless drive module of the present invention;

FIG. 4 shows a schematic of a typical embodiment for the reactionless drive module of the present invention;

FIG. 5 is a cut-away view through the reactionless drive module embodiment of FIG. 4;

FIG. 6 is a cross section view through a reactionless drive module constructed in accordance with an alternate embodiment of the present invention; and FIGS. 7 through 9 are a series of isometric perspective views which illustrate three different terrestrial-based applications for the reactionless, momentum compensated payload positioner of the present invention.

DETAILED DESCRIPTION OF THE PREFERRED EMBODIMENTS

A reactionless, momentum compensated payload positioner 10 constructed in accordance with one embodiment of the present invention is indicated generally by the reference numeral 10 in FIGS. 1 and 2.

The payload positioner 10 comprises a typical 2-axis gimbal 12 which is used to point a payload 14 by rotating the payload 14 about the gimbal's azimuth axis A—A and elevation axis B—B. In the embodiment shown, the payload 14 is a large, highly agile telescope. However, it is understood that a telescope is but one example of a payload that could be pointed or positioned with the reactionless, momentum compensated positioner of the present invention.

Other example positionable payloads that would benefit by the reactionless and momentum compensation principles of the present invention include, but are not limited to, antennas, laser instruments, infrared sensors, mirrors and optical elements, video and film cameras, and missile or other weapon systems.

The payload positioner 10 includes a pair of reactionless drive modules 16a, 16b to rotate the payload 14 about the azimuth and elevation axes, respectively, as shown. In FIG. 1, the azimuth drive module 16a is shown in partial section. Both the azimuth and elevation drive modules 16a and 16b are similarly constructed. An elevation bearing assembly 18 is provided at an end of the gimbal yoke structure opposite the elevation drive module 16b to complete the support of the payload 14 along the elevation axis. This configuration is preferred for maximum structural stiffness, although in an alternate embodiment (not shown), the elevation bearing assembly and associated support structure could be omitted without affecting functionality of the gimbal movement.

As is shown in FIG. 2, an optional position gyroscope 17 can be mounted to the telescope 14 to determine the telescope pointing direction to very high accuracy. Alternately, angular position transducers, such as resolvers or encoders (shown as element 60 in FIG. 4) effective to provide payload pointing information can be provided to and contained within the drive modules 16a, 16b.

In accordance with a method aspect of the present invention, the center of gravity of the rotating system (ie., the rotating portion of the payload positioner 10 and is payload 14) is located at the intersection of the azimuth and elevation axes in order to reduce disturbance torques on the platform that result from positioning movement of the payload 14. The present invention recognizes the necessity of making the inertia of the payload to be as symmetrically disposed as possible about the elevation axis in order to reduce cross-coupling torques about an axis orthogonal to either the elevation or azimuth axes. The method aspects of the invention are discussed in greater detail below.

With reference to FIGS. 3–5, the construction and operation details of the reactionless drive modules will now be described. FIG. 3 shows an exploded view of the principle components of the reactionless drive module of the present invention, in this case, the azimuth drive module 16a. It is understood that the following description also pertains to the elevation drive module 16b as the azimuth and elevation drive modules 16a and 16b are essentially identical in design and operation.

The azimuth drive module 16a includes counter-rotating drive motor and flywheel assemblies, 20 and 22, respectively, which are suspended by bearings for free spinning containment within a stationary housing 24. In use, the housing 24 is securely fastened to the spacecraft platform (not shown). The drive motor assembly 20 drives a main drive shaft 26 which, in turn, is connected to a portion of the gimbal structure for rotating the payload 14 about its drive axis, in this case, the azimuth axis.

In a preferred embodiment, the invention is intended for space application and the drive motor assembly 20 comprises a brushless DC electric motor. In the case of terrestrial-based applications, however, a conventional brush type electric motor may used as the drive motor assembly. As is readily appreciated by those of skill in the art, is conventional brush-type electric motors are not suitable for space applications since they use frictional carbon brushes which are not only short lived in a space vacuum, but also produce arcs, and arcing generally cannot be tolerated in space applications.

As best seen in FIGS. 4 and 5, the main drive shaft 26 is supported on main bearings 28 disposed between the main drive shaft 26 and the stationary housing 24. The main drive shaft 26 is tubular and is formed with an enlarged upper hollow interior portion sized to receive a twist capsule 30 and a narrow diameter tubular bottom portion sized to receive a stationary tube 32. The twist capsule 30 further includes a twist-rotatable upper portion 30a connected to the main drive shaft 26 and a stationary lower portion 30b connected to the stationary tube 32. The twist capsule 30 and stationary tube 32 are used to pass a cable harness 34 from the stationary side of the structure to the rotating portions of the gimbal. The cable harness 34 is used to feed wires to the electric drive motor assembly 22 for sending data control signals to the motor assembly and payload 14. The cable harness 34 consists of counter-wrapped flat ribbon wire cable of the type typically used in gimbal drive modules seeking low parasitic windup torques.

As is readily appreciated by those skilled in the art, use of a twist capsule is the generally preferred technique for passing electrical wiring across a rotatable interface with minimal cable torque. Alternatively, a simply wrapped wire harness could be used in place of the twist capsule, particularly in applications where the angle of rotation is small.

The flywheel assembly 22 includes a flywheel 42 mounted on a support structure 44 which is mounted by flywheel bearings 46 to the main drive shaft 26 such that the flywheel assembly is free spinning with respect to the drive motor assembly 20. The flywheel assembly 22 further includes a main motor rotor (magnets) 40 that is (are) integrated into the momentum compensating and counter-rotating flywheel 42. By incorporating the inertia provided by the main motor rotor 40 into the flywheel 42, a reduction in the size and weight of the flywheel 42 can be achieved.

The drive motor assembly 20 includes a main motor stator 36 supported by support flange 38 that extends from the rotable main drive shaft 26.

When the motor windings (stator 36) are energized, the torque produced will drive the main drive shaft 26 in one direction and simultaneously drive the flywheel assembly 22 in the opposite direction. Directional arrows indicating the respective (and opposite) rotational movements of the main drive shaft 26 and flywheel assembly 22 are best seen with reference to FIG. 5.

Since the torque acting on the main motor stator 36 and main motor rotor 40 must be equal in magnitude and opposite in direction, no torque synchronization servo control loop is needed. The flywheel 42 will automatically torque balance the main motor stator 36, having a velocity that is inversely proportional to their respective rotating inertias, in order that the product of inertia and speed, hence momentum be conserved. This feature provides a significant weight advantage since a relatively small light weight flywheel can be used to compensate for a large, heavy payload by allowing the flywheel to turn at a higher speed.

Also, none of the accelerating torques generated by the main motor stator 36 can be passed back to the stationary housing 24 since the drive motor assembly 20 is freely suspended by the main bearings 28. The only reaction torques acting on the housing 24 will is be the drag created by the main bearings 28, flywheel bearings 46, and the drag due to the windup caused by the wires crossing the rotary interface of the twist capsule 30. Since the main bearings 28 and flywheel bearings 46 are counter-rotating, their respective drag torques tend to cancel each other, although 100% cancellation is typically not achievable in practice.

In the preferred embodiment of the invention, a small trim motor 50 is used to cancel such drag torques to a high degree. The trim motor can also be used to fine tune the position and speed of the payload 14 relative to the stationary housing 24. A situation that arises during the course of exercising and accelerating the flywheel 42 is that torque is added. In view of the inherent imperfections in the system and further in view of parasitic drag forces that are present because of the presence of the bearings, seals and wires in the in the drive module, the torque that is added to the flywheel 42 would cause it to eventually build up in speed over time. If left unchecked, the increasing speed of the flywheel 42 would eventually exceed the physical limits of the bearings and/or drive motor.

Accordingly, another advantageous feature of the trim motor 50 is that it is effective to desaturate the flywheel speed so that it never exceeds some predetermined physical speed limit of the system.

A further advantageous feature of the trim motor 50 is that it is useful for keeping the flywheel 42 in registration with the movable payload 14. The trim motor 50 is also useful for keeping the payload 14 in registration with the stationary housing 24. The trim motor 50 will compensate for any stray reaction torque mismatch from the power transfer device (twist capsule 30) or bearings 28, 46 which feeds the rotating drive motor assembly 20. With an appropriate control strategy, the trim motor 50 will also synchronize the flywheel and payload speed so that they will remain directly proportional to each other but opposite in direction. Full scale experimental measurements have shown that greater than 96% torque and momentum compensation is readily achievable and up to 98% cancellation is still practical.

In the embodiment shown in FIGS. 4 and 5, the trim motor 50 is of direct drive configuration and is coupled to the low speed main drive shaft 26. The winding portion 52 of the trim motor 50 is attached to support flange 54 that rigidly connects to the stationary housing 24. The magnet portion 56 of the trim motor 50 is attached to the flange support 38 that extends from the main drive shaft 26.

The reactionless drive module 16a is provided with a first position transducer or position sensor 60 for measuring the position and speed of the payload 14 relative to the stationary housing 24. The position sensor 60 also provides angular information to commutate the trim motor 50 (in the case where a brushless DC electric motor is used). In the embodiment shown, the position sensor 60 includes an energizing coil 62 attached to the stationary support flange 54 and a signal circuit 64 attached to the support flange 38 extending from the main drive shaft 26.

In practice, the position sensor 60 can be located anywhere between the stationary housing 24 and the main drive shaft 26. An advantage associated with coupling the trim motor 50 directly to the low speed main drive shaft 26 is that it can be directly commutated by the position sensor 60.

Alternatively, the trim motor 50 can be coupled to the high speed flywheel 42 whereby it would be located between the flywheel 42 and the stationary housing 24. An advantage of coupling the trim motor 50 to the high speed fly wheel 42 is that the trim motor could be made smaller, although motor losses may be higher.

The reactionless drive module 16a can further be provided with a second position transducer or rate sensor 66, in the form of a resolver, tachometer or similar speed measuring device, to provide flywheel rate information to the control system and provide commutation information to commutate the drive motor assembly 20 in case it is of the brushless DC motor type. In the embodiment shown, the rate sensor 66 includes a coil portion 68 attached to the main motor stator support flange 38 and a magnet portion 70 attached to the flywheel support flange structure 44. In practice, the rate sensor 66 can be located anywhere between the flywheel 42 and the main drive shaft 26 or between the flywheel 42 and the stationary housing 24.

As noted above, the preferred embodiment of FIGS. 4 and 5 incorporate a direct drive main motor assembly 20 and trim motor 50 for minimum torque disturbance. However, a variation of the previously described embodiment may use geared drive motors which would be advantageous in reducing motor weight at the expense of additional complexity and the introduction of more components that have a potential to fail. In yet another variation of the previously described embodiment, the trim motor 50 could be coupled to the high speed freewheel 42.

FIG. 6 illustrates an alternate and simplified embodiment for the reactionless drive module 16 of the present invention. Structural elements of the alternate embodiment of FIG. 6 common to the embodiments shown in FIGS. 4–5 are indicated by identical reference numerals. Elements that differ in the direction of movement are indicated by primed reference numerals.

In the embodiment of FIG. 6, the housing 24' rotates with the payload and the main shaft 26' is stationary and is fixedly mounted to the platform (not shown). It is noted that the twist capsule 30, feed tube 32 and cable harness 34 have been omitted for clarity.

The trim motor 50' in this embodiment is coupled to the end of the low speed housing 24'. The groups that counter-rotate to provide momentum and torque cancellation (i.e., the flywheel assembly and the main drive shaft 26 plus drive motor assembly 20, respectively) are more plainly visible in this embodiment. Also, in this embodiment, the relative concentric placement of the drive motor assembly 20 with respect to the flywheel assembly 22 is reversed. The main motor stator 36 is connected to the rotating housing 24. The main motor rotor 40 is formed integral with the flywheel 42 which is supported by the support flange 44. The combination of the support flange 44, flywheel 42 and main motor rotor 40 is free spinning on bearings 46.

Still other alternate embodiments contemplate the use of a third reactionless drive module to provide rotational position of a payload about a third axis, e.g., a bore site axis of a telescope payload.

POWER MANAGEMENT

In the case of the two axis version of the reactionless, momentum compensated payload positioner of the present invention, the relative motions of the respective drive modules for the elevation and azimuth axes can be operated in a coordinated and complementary manner. In many cases, the scanning movement of the payload is such that the payload is accelerated along one axis using one drive motor while at the same time the payload is decelerated or braked along the other axis by reversing the direction of the motor on that axis.

A simple example of this is a "race track" scan where the payload is aimed to follow a repeating oval scan pattern. In the straightaway sections of the oval scan pattern, one drive module, e.g. the elevation drive module, is energized to accelerate the payload through the length of the straightaway sections and is then decelerated when moving into the turns. At this point the other drive module, e.g. the azimuth drive module, is accelerated. At the apex of each turn, the speed of the first or elevation drive module is zero and the speed of the second or azimuth drive module is at a maximum. After the apex of the turn, the process is reversed and the first or elevation drive module is accelerated and the second or azimuth drive module is decelerated or braked. In other words, when one drive module is fully braked, the other is at a maximum speed. In order to accelerate a drive module comprising a DC electric motor, electrical energy is added to it. In order to slow down the DC electric drive module, the direction of the electricity to the drive motor windings is reversed. When operated in a reverse direction, the motor functions as a generator and produces energy. Thus, the energy that is produced by the braking of one drive module can be used as the source of energy for accelerating the other drive module and vice versa. The complementary operation of the two drive modules provides a closed loop conservation of energy. A preferred manner of conserving the energy produced by the braking action of the motors is to dump it back into the spacecraft's battery. Both of the motors are electrically linked to the battery and are commutated via driver control boards (typically located on the spacecraft). Without such conservation of energy, the kinetic energy invested in speeding up the payload and reaction flywheel would be lost.

Of course, there are inefficiencies in the transfer of power back and forth between the two drive modules. From the stand point of the battery, the battery only has to make up the net losses in the system. Typically, brushless DC electric motors are 90% efficient, such that when energy is converted to operate the motor in one direction, 10% of the energy is lost. When the motor is reversed and is used as a generator, another 10% is lost. Energy regulation over a typical cycle would only require the battery to put in a total of 20% for one axis. Thus, the present invention offers a significant energy savings over a single-axis aiming actuator systems of the type having only a single drive motor, since these single-axis aiming actuator systems are not able to recapture and reuse the energy required to decelerate or brake the payload and counter rotating flywheel. In other words, for single-axis aiming actuator systems, an energy requirement that is 30 to 50% larger, in practice is needed to power the main drive motor in each direction and still account for the energy losses.

In the case where the duty cycle of the motors involves repeated accelerations and braking activity, as is the case in the present invention, the closed loop conservation of energy system described herein can offer an energy savings of a factor of about 2 to 3 over conventional single-axis aiming actuator systems.

In accordance with another important aspect of the invention, disturbance (or reaction) torques between the rotatable parts of the payload positioner and the non-moving support platform can be substantially eliminated by locating the center of gravity (indicated as CG in FIG. 1) of the moving parts of the system (positioner and payload) at the intersection of the azimuth and elevation axes. It may also be necessary mass balance the payload structure (e.g., by adding mass or subtracting mass to the payload) in such a way so as to reduce the differences between the moments of inertia about the azimuth and elevation axes. This also minimizes the reaction torques transverse to either axis during gimbal motion. Such transverse reaction torques cannot be cancelled by the reactionless drive module and thus need to be minimized.

FIGS. 7-9 shows other applications for the reactionless, momentum compensated payload positioner of the present invention. For example, as shown in FIG. 7, the reactionless, momentum compensated payload positioner can be used by a robotic manipulator arm. Here, the ability to move manufactured parts quickly between work stations without causing undue structural deflection or vibrations can improve part through put and reduce the structural weight of the robotic manipulator arm. The invention may include a third reactionless drive module, here shown as the bore site drive module, for even a greater degree of reactionless, momentum compensated positioning accuracy.

FIG. 8 shows another example of the invention adapted for use in high speed photography or video taping situations where quick panning of the subject is required and minimum disturbance jitter is permissible. The invention, in a multi-axis gimbal configuration would be particularly useful for filming from aircraft and helicopters, in particular.

FIG. 9 illustrates another useful application of the reactionless, momentum compensated payload positioner as a drill for underwater (or zero gravity) use. As is readily appreciated in this embodiment, substantially all the reaction torque produced by operation of the drill would be isolated from the operator thereby permitting the operator to use the drill equipment in any comfortable position without having to brace against the reaction torque back associated with conventional drill tools.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A reactionless momentum compensated payload positioner adapted to be mounted on a supporting body for providing momentum compensation of an oscillatory and scanning payload and for suppressing reactions in the supporting body to the torques that occur as an aiming angle of the payload is changed, said payload positioner comprising:
   a) gimbal means for pointing a payload and having at least two axis of rotation including an elevation axis and an azimuth axis;
   b) first reactionless drive module means for rotating said payload about said elevation axis;
   c) second reactionless drive module means for rotating said payload about said azimuth axis;
   d) each of said first and second reactionless drive module means includes:
      i) a stationary housing;
      ii) a main drive shaft for driving said payload, said main drive shaft being freely rotatably suspended within said stationary housing by main bearings;
      iii) DC electric motor means for rotating said main drive shaft;
      iv) flywheel means freely rotatably mounted to said main drive shaft and operative to rotate in a direction counter to the rotation of said main drive shaft responsive to actuation of said DC electric motor means, said flywheel means automatically and independently adjusts its speed to counter any changes in payload inertia due to operational variations in said aiming angle of said payload, said flywheel means also effective to provide momentum compensation to said payload and thereby substantially eliminate gyroscopic effects that occur due to rotational movement about either one of said at least two axis of said gimbal means;
      v) first position transducer means for determining and controlling payload pointing position and speed;
      vi) second position transducer means for determining speed of said flywheel means;
      vii) trim motor means for eliminating parasitic drag; and
   e) wherein said payload positioner in combination with said payload having a center of gravity located at the intersection of said elevation and azimuth axis such that disturbance torques to the supporting body are substantially eliminated.

2. A reactionless, momentum compensated payload positioner as in claim 1 wherein said gimbal means comprises a yoke structure including an elevation bearing assembly for providing additional rotatable support to said payload about said elevation axis.

3. A reactionless, momentum compensated payload positioner as in claim 1 which further includes third reactionless drive module means for rotating said payload about a bore site axis of said payload.

4. A reactionless, momentum compensated payload positioner as in claim 1 wherein said DC electric motor means includes:
   a) a main motor stator coupled to said main drive shaft; and
   b) a main motor rotor integrated into said flywheel means.

5. A reactionless, momentum compensated payload positioner as in claim 1 wherein said trim motor means includes:
   a) registration means for keeping speed of said flywheel means in registration with speed of said payload and for keeping said payload in registration with said housing; and
   b) desaturation means for desaturating excessive speed build up of said flywheel means due to bias speed errors.

6. A reactionless, momentum compensated payload positioner as in claim 5 wherein said trim motor means includes a DC electric trim motor coupled to said main drive shaft.

7. A reactionless, momentum compensated payload positioner as in claim 6 wherein said first position sensor means includes commutation means for commutating said DC electric trim motor.

8. A reactionless, momentum compensated payload positioner as in claim 6 wherein said trim motor means comprises a DC electric trim motor coupled to said flywheel means.

9. A reactionless, momentum compensated payload positioner as in claim 1 which further includes energy conservation means for capturing energy generated by DC motor deceleration operation of one of said first and second reactionless drive module means and for providing the captured energy for use in DC motor acceleration operation in the other of said first and second reactionless drive module means.

10. A reactionless momentum compensated payload positioner adapted to be mounted on a supporting body for providing momentum compensation of an oscillatory and scanning payload and for suppressing reactions in the supporting body to the torques that occur as an aiming angle of the payload is changed, said payload positioner comprising:
   a) a gimbal assembly for pointing a payload and having at least two axis of rotation including an elevation axis and an azimuth axis;
   b) a first reactionless drive module for rotating said payload about said elevation axis;
   c) a second reactionless drive module for rotating said payload about said azimuth axis;
   d) each of said first and second reactionless drive modules includes:
      i) a stationary housing;
      ii) a main drive shaft for driving said payload, said main drive shaft being freely rotatably suspended within said stationary housing by main bearings;
      iii) a DC electric motor for rotating said main drive shaft;
      iv) a flywheel freely rotatably mounted to said main drive shaft and operative to rotate in a direction counter to the rotation of said main drive shaft responsive to actuation of said DC electric motor, said flywheel automatically and independently adjusts its speed to counter any changes in payload inertia due to operational variations in said aiming angle of said payload, said flywheel also effective to provide momentum compensation to said payload and thereby substantially eliminate gyroscopic effects that occur due to rotational movement about either one of said at least two axis of said gimbal assembly;
      v) a first position transducer for determining and controlling payload pointing position and speed;
      vi) a second position transducer for determining speed of said flywheel;
      vii) a trim motor for eliminating parasitic drag; and
   e) wherein said payload positioner in combination with said payload having a center of gravity located at the intersection of said elevation and azimuth axis such that disturbance torques to the supporting body are substantially eliminated.

11. A reactionless, momentum compensated payload positioner as in claim 10 wherein said gimbal assembly comprises a yoke structure including an elevation bearing assembly for providing additional rotatable support to said payload about said elevation axis.

12. A reactionless, momentum compensated payload positioner as in claim 10 which further includes a third reactionless drive module for rotating said payload about a bore site axis of said payload.

13. A reactionless, momentum compensated payload positioner as in claim 10 wherein said DC electric motor includes:
   a) a main motor stator coupled to said main drive shaft; and
   b) a main motor rotor integrated into said flywheel.

14. A reactionless, momentum compensated payload positioner as in claim 10 wherein said trim motor includes a DC electric trim motor coupled to said main drive shaft.

15. A reactionless, momentum compensated payload positioner as in claim 14 wherein said DC electric trim motor is commutated by said first position sensor.

16. A reactionless, momentum compensated payload positioner as in claim 14 wherein said trim motor comprises a DC electric trim motor coupled to said flywheel.

17. A reactionless, momentum compensated payload positioner as in claim 10 wherein said first and second reactionless drive modules are operated in complimentary fashion such that energy produced by deceleration operation of said DC electric motor of one of said first and second reactionless drive modules is captured and directed for use in supplying power for acceleration operation of said DC electric motor of the other of said first and second reactionless drive modules.

18. A reactionless momentum compensated payload positioner adapted to be mounted on a supporting body for providing momentum compensation of an oscillatory and scanning payload and for suppressing reactions in the supporting body to the torques that occur as an aiming angle of the payload is changed, said payload positioner comprising:
   a) gimbal means for pointing a payload and having at least two axis of rotation including an elevation axis and an azimuth axis;
   b) first reactionless drive module means for rotating said payload about said elevation axis;
   c) second reactionless drive module means for rotating said payload about said azimuth axis;
   d) each of said first and second reactionless drive module means includes:
      i) a stationary main shaft connected to said supporting body;
      ii) a housing connected to said payload, said housing being freely rotatably suspended on said stationary main shaft by main bearings;
      iii) DC electric motor means for rotating said housing and said payload about said main shaft;
      iv) flywheel means freely rotatably mounted to said main shaft and operative to rotate in a direction counter to the rotation of said housing responsive to actuation of said DC electric motor means, said flywheel means automatically and independently adjusts its speed to counter any chances in payload inertia due to operational variations in said aiming angle of said payload, said flywheel means also effective to provide momentum compensation to said payload and thereby substantially eliminate gyroscopic effects that occur due to rotational movement about either one of said at least two axis of said gimbal means;

v) first position transducer means for determining and controlling payload pointing position and speed;

vi) second position transducer means for determining speed of said flywheel means;

vii) trim motor means for eliminating parasitic drag; and e) wherein said payload positioner in combination with said payload having a center of gravity located at the intersection of said elevation and azimuth axis such that disturbance torques to the supporting body are substantially eliminated.

19. A reactionless, momentum compensated payload positioner as in claim 18 wherein said gimbal means comprises a yoke structure including an elevation bearing assembly for providing additional rotatable support to said payload about said elevation axis.

20. A reactionless, momentum compensated payload positioner as in claim 18 which further includes third reactionless drive module means for rotating said payload about a bore site axis of said payload.

21. A reactionless, momentum compensated payload positioner as in claim 18 wherein said DC electric motor means includes:

a) a main motor stator coupled to said housing; and b) a main motor rotor integrated into said flywheel means.

22. A reactionless, momentum compensated payload positioner as in claim 18 wherein said trim motor means includes:

a) registration means for keeping speed of said flywheel means in registration with speed of said payload and for keeping said payload in registration with said housing; and b) desaturation means for desaturating excessive speed build up of said flywheel means due to bias speed errors.

23. A reactionless, momentum compensated payload positioner as in claim 22 wherein said trim motor means includes a DC electric trim motor coupled to said housing.

24. A reactionless, momentum compensated payload positioner as in claim 23 wherein said first position sensor means includes commutation means for commutating said DC electric trim motor.

25. A reactionless, momentum compensated payload positioner as in claim 23 wherein said trim motor means comprises a DC electric trim motor coupled to said flywheel means.

26. A reactionless, momentum compensated payload positioner as in claim 18 which further includes energy conservation means for capturing energy generated by DC motor deceleration operation of one of said first and second reactionless drive module means and for providing the captured energy for use in DC motor acceleration operation in the other of said first and second reactionless drive module means.

27. A reactionless momentum compensated payload positioner adapted to be mounted on a supporting body for providing momentum compensation of an oscillatory and scanning payload and for suppressing reactions in the supporting body to the torques that occur as an aiming angle of the payload is changed, said payload positioner comprising:

a) a gimbal assembly for pointing a payload and having at least two axis of rotation including an elevation axis and an azimuth axis;

b) a first reactionless drive module for rotating said payload about said elevation axis;

c) a second reactionless drive module for rotating said payload about said azimuth axis;

d) each of said first and second reactionless drive modules includes:

i) a stationary main shaft connected to said supporting body;

ii) a housing connected to said payload, said housing being freely rotatably suspended on said stationary main shaft by main bearings;

iii) a DC electric motor for rotating said housing about said main shaft;

iv) a flywheel freely rotatably mounted to said main shaft and operative to rotate in a direction counter to the rotation of said housing responsive to actuation of said DC electric motor, said flywheel automatically and independently adjusts its speed to counter any changes in payload inertia due to operational variations in said aiming angle of said payload, said flywheel also effective to provide momentum compensation to said payload and thereby substantially eliminate gyroscopic effects that occur due to rotational movement about either one of said at least two axis of said gimbal assembly;

v) a first position transducer for determining and controlling payload pointing position and speed;

vi) a second position transducer for determining speed of said flywheel;

vii) a trim motor for eliminating parasitic drag; and e) wherein said payload positioner in combination with said payload having a center of gravity located at the intersection of said elevation and azimuth axis such that disturbance torques to the supporting body are substantially eliminated.

28. A reactionless, momentum compensated payload positioner as in claim 27 wherein said gimbal assembly comprises a yoke structure including an elevation bearing assembly for providing additional rotatable support to said payload about said elevation axis.

29. A reactionless, momentum compensated payload positioner as in claim 27 which further includes a third reactionless drive module for rotating said payload about a bore site axis of said payload.

30. A reactionless, momentum compensated payload positioner as in claim 27 wherein said DC electric motor includes:

a) a main motor stator coupled to said housing; and b) a main motor rotor integrated into said flywheel.

31. A reactionless, momentum compensated payload positioner as in claim 27 wherein said trim motor includes a DC electric trim motor coupled to said housing.

32. A reactionless, momentum compensated payload positioner as in claim 31 wherein said DC electric trim motor is commutated by said first position sensor.

33. A reactionless, momentum compensated payload positioner as in claim 31 wherein said trim motor comprises a DC electric trim motor coupled to said flywheel.

34. A reactionless, momentum compensated payload positioner as in claim 27 wherein said first and second reactionless drive modules are operated in complimentary fashion such that energy produced by deceleration operation of said DC electric motor of one of said first and second reactionless drive modules is captured and directed for use in supplying power for acceleration operation of said DC electric motor of the other of said first and second reactionless drive modules.

* * * * *